2,986,529
COPPER ACTIVATED ALKALINE EARTH HALO PHOSPHATE PHOSPHORS

Alfred Hamilton McKeag, Wembley, and Brian Everard Hunt, Bushey Heath, England, assignors to The General Electric Company Limited, London, England No Drawing. Filed Mar. 11, 1958, Ser. No. 720,552

Claims priority, application Great Britain Mar. 11, 1957

16 Claims. (Cl. 252—301.4)

This invention relates to phosphors of the kind consisting of crystalline inorganic material activated so as to be excitable to luminescence by one or more of the usual exciting agencies, which comprise ultra-violet radiation of long wavelength, that is to say of wavelength greater than 3000 A., ultra-violet radiation of short wavelength, that is to say, less than 3000 A., cathode rays and X-rays.

The invention also includes within its scope electrical devices, such as high and low pressure mercury vapour fluorescent electric discharge lamps, and also cathode ray tubes, and X-ray screens, which incorporate one or more phosphors in accordance with the invention arranged so as to be excited to luminescence during the operation of the device.

One well known class of phosphors of the kind referred to consists of alkaline earth metal halophosphates, which are usually activated by antimony, or by antimony and manganese. This class of phosphors has the apatite type of crystal structure and is of particular interest (especially the calcium and strontium fluoro- or chloro-phosphates) for use in low pressure mercury vapour fluorescent electric discharge lamps.

Other forms of activator for the alkaline earth metal halophosphates have been proposed, but of these only bismuth, lead, tin, silver, uranium, arsenic and cerium have appeared to be of any interest. We have now found, however, that copper in the lower valency state, that is to say in the cuprous state, can act as an efficient activator of these materials and in some cases gives rise to luminescence having a strong red component.

According, therefore, to the invention a crystalline inorganic phosphor consists of an alkaline earth metal halophosphate activated by copper in the cuprous state so as to be excitable to luminescence by at least one of the exciting agencies consisting of ultra-violet radiation of long wavelength, ultra-violet radiation of short wavelengths, cathode rays, X-rays.

If desired, a phosphor according to the invention may also contain tin in the stannous state, or manganese, or both stannous tin and manganese, as an additional activator or activators.

In the halophosphate phosphors of the invention, the alkaline earth metal may be one or more of the metals calcium, strontium and barium, and one or more halogens may be present, the preferred halogens being chlorine and fluorine. When two or more different alkaline earth metals and/or two or more different halogens are present, the phosphor consists of a solid solution of two or more alkaline earth metal halophosphates, activated as aforesaid. The phosphors possess the apatite crystal structure characteristic of the known halophosphates, and their composition can be represented by the usual halophosphate formula $3M_3(PO_4)_2.1ML_2$, where M is alkaline earth metal and L is halogen. For the purposes of this invention only the elements calcium, strontium, and barium are to be regarded as alkaline earth metals.

The proportion of copper, copper and tin, incorporated in the phosphors of the invention is not critical, but may be in the range of 0.001% to 5.0%, and is preferably in the range of 0.1% to 2.0%, by weight of the total weight of phosphor, including the activator or activators, calculated from the starting materials used. If manganese is employed as an additional activator, the amount added may be up to 5.0% by weight, and is usually similar to that of the copper, or copper and tin.

Most of the phosphors in accordance with the invention are excited to luminescence by ultra-violet radiation of both long and short wavelength, for example 3650 A. and 2537 A.; however some of the phosphors exhibit stronger luminescence under excitation by long wavelength ultra-violet radiation, and are therefore particularly suitable for use in high pressure mercury vapour fluorescent electric discharge lamps, while other phosphors of the invention exhibit stronger luminescence under excitation by short wave-length ultra-violet radiation and are therefore more suitable for use in low pressure mercury vapour fluorescent electric discharge lamps. Many, if not all, of the phosphors are also excited to luminescence by cathode rays, or by X-rays, or both. The colours of fluorescence exhibited by the phosphors vary considerably with different halophosphate compositions, with the activators used, and with the exciting agency, as will be shown in the specific examples given hereinafter, but in the majority of the phosphors which we have examined the light emitted under long wavelength ultra-violet excitation is predominantly red and that emitted under short wavelength ultra-violet excitation is predominantly blue. It may be noted that the production of red luminescence by copper activation, as in the case of some of the phosphors of the invention, is unexpected. The effect of the inclusion of manganese in any of the phosphors of the invention is to shift the emission towards the red end of the spectrum.

Some of the phosphors in accordance with the invention are characterised by exceptionally good temperature stability, that is to say they are capable of retaining their luminescent properties when heated to relatively high temperatures. This property renders such phosphors particularly advantageous for use in high pressure mercury vapour electric discharge lamps for modifying the colour of the light emitted by the discharge in mercury vapour. An example of a phosphor which is particularly useful in this respect is barium chlorophosphate activated by cuprous copper, which gives a strong red fluorescence under 3650 A. excitation at room temperature, the colour of the fluorescence changing to yellow with a strong red component when the temperature of the phosphor is raised, this change commencing at about 100° C. It will be appreciated that when a phosphor in accordance with the invention primarily excitable by 2537 A. radiation is employed in a high pressure mercury vapour lamp, and is located, as is usual, outside the discharge envelope of the lamp, the discharge envelope must be formed of quartz or of a glass capable of transmitting 2537 A. radiation. Another phosphor which is of particular interest, since it exhibits luminescence having a strong red component under 3650 A. excitation, is barium fluorophosphate activated by cuprous copper, although this phosphor does not have quite such good temperature stability as the aforementioned barium chlorophosphate phosphors.

If desired a phosphor in accordance with the invention, of good temperature stability, may be used in a high pressure mercury vapour electric discharge lamp in conjunction with another phosphor known to be suitable for this purpose, for obtaining a desired colour correction.

The calcium chlorophosphates in accordance with the invention, activated by copper, with or without tin and with or without manganese, are excited most strongly by 2537 A. radiation and are therefore suitable for use in low pressure mercury vapour electric discharge lamps.

A phosphor in accordance with the invention may be manufactured by mixing in the required proportions the halophosphate material or a mixture of compounds which react or combine to produce such material on heating, for example with the appropriate alkaline earth metal phosphate, carbonate and halide, with a compound or compounds of copper, together with a compound or compounds of tin and/or a compound of manganese if tin and/or manganese is or are required in the phosphor as an additional activator or activators, and heating the mixture so formed in a weakly reducing atmosphere at a temperature or temperatures in the range of 700° C. to 1250° C. Preferably the heating is effected in at least two stages, the second heating, and any subsequent heatings, usually being carried out at a somewhat higher temperature than the first and the material being ground to powder between the heating steps. The phrase "a weakly reducing atmosphere" is to be understood to mean an atmosphere capable of bringing about the reduction of the copper, and tin if present, to the lower valency states during the heating, without producing any free metallic copper or tin. We have found that a mixture of nitrogen with a small proportion of hydrogen provides a suitable atmosphere: the preferred ratios of nitrogen to hydrogen, by volume, being in the range of $1000N_2:1H_2$ to $200N_2:1H_2$.

It will be understood that all the materials used in the manufacture of these phosphors should be of the high degree of purity usually required in the preparation of phosphors.

The manufacture of some specific phosphors in accordance with the invention which we have prepared will now be described in the following examples.

(1) *Barium fluorophosphate activated by cuprous copper*

The following ingredients were shaken together as dry powders in the proportions indicated:

14.5 gms. $BaHPO_4$
5.5 gms. $BaCO_3$
1.8 gms. $BaF_2$
0.39 gm. $CuSO_4.5H_2O$

This amount of copper sulphate gave 0.5% by weight of copper in the completed phosphor. The mixture was fired for one hour at 800° C. in an atmosphere of mixed nitrogen and hydrogen in the ratio of 400 volumes of nitrogen to one volume of hydrogen: this mixture was produced by mixing a stream of nitrogen flowing at the rate of one litre per minute with hydrogen flowing at the rate of 2.5 ccs. per minute. The material was then ground thoroughly, and refired at 1200° C. for about one hour in a mixture of nitrogen and hydrogen, in the same proportions as before, being allowed to cool in the same atmosphere.

The phosphor so produced showed a strong red fluorescence when excited by 3650 A. radiation. The phosphor also had good temperature stability, these properties rendering it especially suitable for use in high pressure mercury vapour fluorescent electric discharge lamps for colour correction purposes.

(2) *Calcium chlorophosphate activated by cuprous copper*

The following ingredients were wet mixed in the proportions indicated, dried at 300° C., and ground together whilst still hot:

7.96 gms. $CaHPO_4$
2.64 gms. $CaCO_3$
1.08 gms. $CaCl_2$
0.5% by weight of Cu (added as an aqueous solution of copper sulphate)

After grinding, the mixture was fired in an atmosphere of mixed nitrogen and hydrogen (containing about 400 volumes of nitrogen to one volume of hydrogen) for one hour at 800° C. The mixture was allowed to cool in this atmosphere, reground, and refired in the same atmosphere at 1200° C. for an hour, being allowed to cool in that atmosphere.

The phosphor so produced showed a green-blue fluorescence of moderate intensity, under excitation by 2537 A. and was found to be especially suitable for use in low pressure mercury vapour fluorescent electric discharge lamps.

(3) *Calcium chloro-fluorophosphate activated by copper*

4.02 gms. $CaHPO_4$
1.33 gms. $CaCO_3$
0.10 gm. $CaF_2$
0.41 gm. $CaCl_2$
0.5% by weight of copper (added as 1% Cu, $CuSO_4$ solution)

These ingredients were wet mixed, dried at 300° C., ground, and fired for 1 hour at 850° C. in an atmosphere of mixed nitrogen and hydrogen, containing about 400 volumes of nitrogen to one volume of hydrogen. The powder was allowed to cool in this atmosphere, ground and refired at 1200° C. for 15 minutes in the same atmosphere, allowed to cool in the mixed gases, and then lightly ground.

The resulting phosphor showed a strong blue fluorescence when excited by 2537 A. radiation and a weak blue fluorescence when excited by 3650 A. radiation.

(4) *Calcium chlorophosphate activated by copper and manganese*

3.99 gms. $CaHPO_4$
1.32 gms. $CaCO_3$
0.54 gm. $CaCl_2$
0.5% by weight of Cu (added as $CuSO_4$ solution)
1% by weight of Mn (added as 0.14 gram $MnHPO_4$)

These ingredients were treated as in Example 3.

The resulting phosphor showed a strong pink fluorescence when excited by 2537 A. radiation.

(5) *Strontium chlorophosphate activated by copper*

The ingredients used were:

3.71 gms. $SrHPO_4$
1.35 gms. $SrCO_3$
0.90 gm. $SrCl_2.6H_2O$
0.5% by weight Cu (added as $CuSO_4$ solution)

These ingredients were treated as in Example 3.

The resulting phosphor showed a moderate pink fluorescence when excited by 3650 A. radiation.

(6) *Barium fluorophosphate activated by copper and tin*

7.32 gms. $BaHPO_4$
2.75 gms. $BaCO_3$
0.90 gm. $BaF_2$
0.5% by weight Cu (added as $CuSO_4$ solution)
1% by weight Sn (added as 0.09 gram $SnHPO_4$)

These ingredients were treated as in Example 3.

The resulting phosphor showed a strong orange-red fluorescence (with a high red emission) when excited by 3650 A. radiation, (7) *Barium chlorophosphate activated by copper*

7.11 gms. $BaHPO_4$
2.70 gms. $BaCO_3$
1.24 gms. $BaCl_2.2H_2O$
0.5% by weight Cu (added as $CuSO_4$ solution)

The ingredients were treated as in Example 3.

The resulting phosphor showed a strong red fluorescence at room temperature when excited by 3650 A., changing to a yellow fluorescence with a strong red component on heating above 100° C., and a moderate blue-green fluorescence when excited by 2537 A. radiation.

(8) *Calcium chlorophosphate activated by copper and tin*

3.99 gms. $CaHPO_4$
1.32 gms. $CaCO_3$
0.54 gm. $CaCl_2$
0.5% by weight of Cu (added as $CuSO_4$ solution)
1% by weight of Sn (added as 0.09 gram $SnHPO_4$)

These ingredients were treated as in Example 3.

The resulting phosphor showed a strong blue-white fluorescence when excited by 2537 A. radiation, and a moderate more saturated blue when excited by 3650 A. radiation.

(9) *Strontium fluoro-chlorophosphate activated by copper*

7.44 gms. $SrHPO_4$
2.70 gms. $SrCO_3$
0.21 gm. $SrF_2$
0.81 gm. $SrCl_2$
0.5% by weight of Cu (added as $CuSO_4$ solution)

These ingredients were wet mixed, and the mixture was dried at 300° C., ground, and fired in an atmosphere consisting of nitrogen and hydrogen in the ratio of about $400N_2:1H_2$ by volume, at 850° C. for one hour. The material was ground and refired for 15 minutes at 1200° C. in the same atmosphere, the material being allowed to cool in the nitrogen-hydrogen atmosphere after each firing step.

The phosphor obtained showed a moderate blue fluorescence under 2537 A. excitation, and a weak pink-blue fluorescence under 3650 A. excitation.

(10) *Barium chlorophosphate activated by copper*

106.7 gms. $BaHPO_4$
40.5 gms. $BaCO_3$
18.6 gms. $BaCl_2.2H_2O$
0.4% by weight of copper, added as an aqueous solution of $Cu(NO_3)_2$ The ingredients were wet mixed and the mixture was dried at 300° C. and fired according to the following schedule, the material being cooled in the same atmosphere, ground and sieved after each firing step.

(1) ½ hour at 1000° C. in $N_2$-$H_2$ mixture
(2) ½ hour at 1000° C. in $N_2$-$H_2$ mixture
(3) ½ hour at 900° C. in air
(4) ½ hour at 950° C. in $N_2$-$H_2$ mixture
(5) ½ hour at 1025° C. in $N_2$-$H_2$ mixture
(6) ½ hour at 1100° C. in nitrogen.

The $N_2$-$H_2$ mixture employed consisted of 500 volumes of nitrogen to one volume of hydrogen.

The resulting phosphor showed strong red fluorescence under 3650 A. excitation at room temperature, which changed towards the yellow as the phosphor was heated, the maximum brightness being attained at about 300° C. to 350° C.

We claim:

1. A crystalline inorganic phosphor excitable to luminescence by at least one of the exciting agencies consisting of ultraviolet radiation of long wavelength, ultraviolet radiation of short wavelength, cathode rays, X-rays, which consists of an alkaline earth metal halophosphate incorporating an activating proportion of copper in the cuprous state.

2. A phosphor according to claim 1 wherein the proportion of copper is in the range of 0.001% to 5.0% by weight of the total weight of the phosphor.

3. A phosphor according to claim 2, wherein the proportion of copper is in the range of 0.1% to 2.0% by weight of the total weight of the phosphor.

4. A phosphor according to claim 1 incorporating manganese as an additional activator, in a proportion up to 5.0% by weight of the total weight of the phosphor.

5. A phosphor according to claim 1, incorporating tin in the stannous state as an additional activator, the proportions of copper and tin together amounting to a proportion in the range of 0.001% to 5.0% by weight of the total weight of the phosphor.

6. A phosphor according to claim 5 wherein the proportions of copper and tin together amount to a proportion in the range of 0.1% to 2.0% by weight of the total weight of the phosphor.

7. A phosphor according to claim 5, incorporating manganese as an additional activator, in a proportion up to 5.0% by weight of the total weight of the phosphor.

8. A phosphor as set forth in claim 1 which consists of calcium chlorofluorophosphate activated by copper, in the cuprous state, in the proportion of 0.5% by weight of the total weight of the phosphor.

9. A phosphor as set forth in claim 1 which consists of barium chlorophosphate activated by copper, in the cuprous state, in the proportion of 0.5% by weight of the total weight of the phosphor.

10. A phosphor as set forth in claim 1 which consists of calcium chlorophosphate activated by copper in the cuprous state, in the proportion of 0.5% by weight of the total weight of the phosphor and by tin, in the stannous state, in the proportion of 1% by weight of the total weight of the phosphor.

11. A method of manufacturing a phosphor consisting of an alkaline earth metal halophosphate activated by copper in the cuprous state, which method includes the steps of mixing a starting material capable of producing the required halophosphate composition on heating, with at least one compound of copper, and heating the mixture so formed at a temperature in the range of 700° C. to 1250° C. in an atmosphere consisting of a mixture of nitrogen and hydrogen in a ratio in the range of $$1000N_2:1H_2$$

to $200N_2:1H_2$, by volume.

12. A method according to claim 11 wherein, for incorporating manganese in the phosphor as an additional activator, the said starting material capable of producing the required halophosphate composition on heating is mixed with a compound of manganese in addition to a compound of copper.

13. A method according to claim 11 wherein the heating is effected in at least two stages the second heating, and any subsequent heatings, usually being carried out at a higher temperature than the first, and the material being ground to powder between the heating steps.

14. A method of manufacturing a phosphor consisting of an alkaline earth metal halophosphate activated by copper in the cuprous state and tin in the stannous state, which method includes the steps of mixing a starting material capable of producing the required halophosphate composition on heating, with at least one compound of copper and at least one compound of tin, and heating the mixture so formed at a temperature in the range of 700° C. to 1250° C. in an atmosphere consisting of a mixture of nitrogen and hydrogen in a ratio in the range of $1000N_2:1H_2$ to $200N_2:1H_2$, by volume.

15. A method according to claim 14 wherein the heating is effected in at least two stages, the second heating, and any subsequent heatings, usually being carried out at a higher temperature than the first, and the material being ground to powder between the heating steps.

16. A method according to claim 14 wherein, for incorporating manganese in the phosphor as an additional activator, the said starting material capable of producing the required halophosphate composition on heating is mixed with a compound of manganese in addition to a compound of copper and a compound of tin.

References Cited in the file of this patent

UNITED STATES PATENTS

| | | | |
|---|---|---|---|
| 2,488,733 | McKeag | Nov. 22, | 1949 |
| 2,619,471 | Butler | Mar. 14, | 1950 |
| 2,664,401 | McKeag | Dec. 29, | 1953 |
| 2,689,917 | Switzer | Sept. 21, | 1954 |
| 2,709,766 | Nagy et al. | May 31, | 1955 |
| 2,730,504 | McKeag | Jan. 10, | 1956 |
| 2,740,050 | Schultz | Mar. 27, | 1956 |
| 2,785,327 | Anderson | Mar. 12, | 1957 |
| 2,786,034 | Butler | Mar. 19, | 1957 |
| 2,802,129 | Meister et al. | Aug. 6, | 1957 |
| 2,809,167 | McKeag | Oct. 18, | 1957 |
| 2,824,072 | Butler | Feb. 18, | 1958 |
| 2,826,553 | Butler | Mar. 11, | 1958 |

FOREIGN PATENTS

| | | | |
|---|---|---|---|
| 580,363 | Great Britain | Sept. 5, | 1946 |
| 610,025 | Great Britain | Oct. 11, | 1948 |
| 733,613 | Great Britain | July 13, | 1955 |
| 833,390 | Germany | Feb. 7, | 1952 |